United States Patent
Chakrabarty

(10) Patent No.: US 10,041,340 B2
(45) Date of Patent: Aug. 7, 2018

(54) RECOVERY FROM A HYDROCARBON RESERVOIR BY CONDUCTING AN EXOTHERMIC REACTION TO PRODUCE A SOLVENT AND INJECTING THE SOLVENT INTO A HYDROCARBON RESERVOIR

(71) Applicant: Tapantosh Chakrabarty, Calgary (CA)

(72) Inventor: Tapantosh Chakrabarty, Calgary (CA)

(73) Assignee: ExxonMobil Upstream Research Company, Spring, TX (US)

(*) Notice: Subject to any disclaimer, the term of this patent is extended or adjusted under 35 U.S.C. 154(b) by 535 days.

(21) Appl. No.: 14/482,999

(22) Filed: Sep. 10, 2014

(65) Prior Publication Data
US 2015/0176381 A1     Jun. 25, 2015

(30) Foreign Application Priority Data
Dec. 19, 2013   (CA) .................... 2837471

(51) Int. Cl.
| *E21B 43/24* | (2006.01) |
| *C09K 8/592* | (2006.01) |
| *C09K 8/52* | (2006.01) |

(52) U.S. Cl.
CPC ............... *E21B 43/24* (2013.01); *C09K 8/52* (2013.01); *C09K 8/592* (2013.01)

(58) Field of Classification Search
CPC ...... E21B 21/068; E21B 36/008; E21B 43/24; C09K 8/592
See application file for complete search history.

(56) References Cited

U.S. PATENT DOCUMENTS

| 2,412,765 A | 12/1946 | Buddrus et al. ................ 166/21 |
| 4,008,764 A | 2/1977 | Allen ............................ 166/266 |
| 4,372,386 A * | 2/1983 | Rhoades ............... C09K 8/592 |
| | | 165/45 |
| 4,819,724 A | 4/1989 | Bou-Mikael et al. ........ 166/263 |
| 5,025,863 A | 6/1991 | Haines et al. ............. 166/305.1 |

(Continued)

FOREIGN PATENT DOCUMENTS

| CA | 1015656 | 8/1977 | ...................... 166/31 |
| CA | 1059432 | 7/1979 | ............. E21B 43/00 |

(Continued)

OTHER PUBLICATIONS

Goldthorpe, Steve (2013) "Cement Plant $CO_2$ to DME," *IEAGHG Information Paper*; 2013-IP9, Jun. 2013, 1 page.

(Continued)

*Primary Examiner* — Catherine Loikith
(74) *Attorney, Agent, or Firm* — ExxonMobil Upstream Research Company—Law Department

(57) ABSTRACT

A method of recovering heavy oil from a subterranean heavy oil reservoir. The method includes conducting an exothermic chemical reaction of feedstock chemicals to produce a reaction product that that is a first solvent and injecting an injected solvent including the reaction product into the subterranean heavy oil reservoir. The injected solvent has an injected solvent temperature equal to an elevated temperature resulting from heat generated by the at least one exothermic chemical reaction and the injecting occurs before the injected solvent temperature has decreased to an ambient reservoir temperature.

21 Claims, 3 Drawing Sheets

(56) References Cited

U.S. PATENT DOCUMENTS

| | | | | |
|---|---|---|---|---|
| 5,407,009 | A | 4/1995 | Butler et al. | 166/266 |
| 5,607,016 | A | 3/1997 | Butler | 166/263 |
| 5,674,816 | A | 10/1997 | Loree | 507/118 |
| 5,725,054 | A | 3/1998 | Shayegi et al. | 166/263 |
| 5,771,973 | A | 6/1998 | Jensen et al. | 166/303 |
| 6,039,116 | A | 3/2000 | Stevenson et al. | 166/263 |
| 6,318,464 | B1 | 11/2001 | Mokrys | 166/252.1 |
| 6,405,799 | B1 | 6/2002 | Vallejos et al. | 166/263 |
| 6,769,486 | B2 | 8/2004 | Lim et al. | 166/263 |
| 2009/0189617 | A1* | 7/2009 | Burns | E21B 43/24 324/649 |
| 2011/0180262 | A1* | 7/2011 | O'Dowd | C10G 1/06 166/303 |

FOREIGN PATENT DOCUMENTS

| | | | |
|---|---|---|---|
| CA | 1122115 | 4/1982 | E21B 43/28 |
| CA | 2108723 | 4/1995 | E21B 43/24 |
| CA | 2141112 | 7/1996 | E21B 43/22 |
| CA | 2108349 | 8/1996 | E21B 43/24 |
| CA | 2147079 | 10/1996 | E21B 43/16 |
| CA | 2243105 | 8/1999 | E21B 43/22 |
| CA | 2281276 | 2/2001 | E21B 43/24 |
| CA | 2304938 | 2/2001 | E21B 43/24 |
| CA | 2306016 | 10/2001 | E21B 21/08 |
| CA | 2351148 | 12/2002 | E21B 43/24 |
| CA | 2462359 | 9/2005 | E21B 43/24 |

OTHER PUBLICATIONS

Lim, G. B. et al. (1994) "Three Dimensional Scaled Physical Modeling of Solvent Vapour Extraction of Cold Lake Bitumen," *Canadian SPE Int'l Conf. on Recent Advances in Horizontal Well Applications*, Paper No. HWC94-46, Calgary, Canada, Mar. 20-23, 1994, 11 pages.

Lim, G. B. et al. (1995) "Cyclic Stimulation of Cold Lake Oil Sand With Supercritical Ethane," SPE #30298, *Int'l Heavy Oil Symposium*, Calgary, Alberta, Canada, Jun. 19-21, 1995, pp. 521-528.

Lyubovsky, Maxim et al. (2005) "Catalytic Partial 'Oxidation of Methane to Syngas' at Elevated Pressures," *Catalysis Letters*, v. 99, Nos. 3-4, Feb. 2005, pp. 113-117.

Nexant, Inc. (2008), "Dimethyl Ether Technology and Markets," *CHEMSystems PERP Program Report* 07/08S3, Dec. 2008.

Qi, Gong-Xin et al. (2001) "DME Synthesis from Carbon Dioxide and Hydrogen Over Cu—Mo/HZSM-5," *Catalysis Letters*, v. 72, Nos. 1-2, 2001, pp. 121-124.

Zhang, Liang et al. (2013) "Dehydration of Methanol to Dimethyl Ether Over $\gamma-AL_2O_3$ Catalyst: Intrinsic Kinetics and Effectiveness Factor," *Canadian Jrnl. of Chem. Engineering*, v. 91, Sep. 2013, pp. 1538-1546.

\* cited by examiner

RECOVERY FROM A HYDROCARBON RESERVOIR BY CONDUCTING AN EXOTHERMIC REACTION TO PRODUCE A SOLVENT AND INJECTING THE SOLVENT INTO A HYDROCARBON RESERVOIR

CROSS REFERENCE TO RELATED APPLICATIONS

This application claims priority from Canadian Patent Application number 2,837,471 which was filed on 19 Dec. 2013, which is incorporated herein by reference.

FIELD

The disclosure relates to an in-situ solvent-based process to produce heavy oil, and especially bitumen, from oil sands and heavy oil reservoirs. More particularly, the disclosure relates to such processes that involve the use of heat and solvent dilution for heavy oil production.

BACKGROUND

A significant amount of bitumen in Alberta, Canada and other parts of the world is located either in thin, bottom-water reservoirs or water-sensitive sands that are not amenable to exploitation by steam-based processes. Potential alternatives to extract heavy oil from these reservoirs are solvent-dominated processes, sometimes referred to as Diluent-Based Recovery (DBR) processes. The advantages of the solvent-dominated processes include significant reduction in greenhouse gas emissions, little heat loss, and limited water handling. The disadvantages of the solvent-dominated recovery processes include high solvent cost and inherently low production rates limited by mass transfer of the solvent into the heavy oil.

In general, many processes and methods utilizing a variety of solvents/diluents under a variety of temperature and pressure conditions have been developed to improve solubilization and production of hydrocarbons from reservoirs.

Lim et al. in Canadian SPE/CIM/Canmet International Conference on Recent Advances in Horizontal Well Application, Mar. 20-24, 1994, discloses the use of light hydrocarbon solvents to produce bitumen for Cold Lake (Alberta) oil sands in three-dimensional scaled physical modeling experiments. Lim et al. discloses that the production rate of bitumen was significantly higher than what could be expected from molecular diffusion of the solvent into the bitumen. Lim et al. surmised that other mechanisms, probably solvent dispersion or fingering, are important in mass transfer of solvent into bitumen.

Lim et al. (1995) in Society of Petroleum Engineers paper no. SPE 302981 p. 521-528 discloses cyclic stimulation of Cold Lake oil sands with supercritical ethane through a single horizontal injector/producer well in a model system. Supercritical ethane enhanced the cyclic solvent gas process by improving the early production rate. SPE 302981 directs the reader towards using supercritical ethane.

Canadian Patent No. 2,349,234 discloses a Cyclic Solvent Process (CSP) for heavy oil production involving injecting a viscosity reducing solvent into a reservoir at a pressure above a liquid/vapor change pressure of the solvent, allowing the solvent to mix with the heavy oil under pore dilation conditions, and then reducing the pressure to below the liquid/vapor change pressure, thereby causing solvent gas drive of the solvent from the reservoir.

In addition to relying on the choice of solvent and pressure, heat has also been introduced into the reservoir to reduce the viscosity of the heavy oil, thereby enhancing the flow and recovery of heavy oil. The introduction of heat also results in the suppression of the formation of a second liquid phase that is often formed when solvent at low temperature is mixed with heavy oil whereby the heaviest of the heavy oil constituents (asphaltenes) resides in a heavier layer and a solution of the lighter components in the solvent forms a separate upper layer. The heavier layer creates a gummy residue that may potentially clog up production wells. Consequently the avoidance of the formation of the heavier layer is advantageous. Several methods for the introduction of heat have been proposed. The methods include surface heating by indirect heat exchange between the solvent and a hotter fluid, and downhole heating by electrical means e.g. resistance heating, and electromagnetic heating such as radio frequency (RF) and inductive heating (IH). The methods are energy-intensive, expensive, and tend to create significant quantities of greenhouse gases. In-situ combustion by burning a portion of the native heavy oil production or a portion of the injected solvent has also been proposed, but it suffers from safety issues and operational challenges.

There is a need for an effective way of providing heat to solvent-dominated recovery processes.

SUMMARY

The present disclosure provides a method of recovering heavy oil from a subterranean heavy oil reservoir, among other things.

A method of recovering heavy oil from a subterranean heavy oil reservoir may comprise conducting an exothermic chemical reaction of a feedstock chemical to produce a reaction product that is a first solvent and injecting an injected solvent comprising the reaction product into the subterranean heavy oil reservoir. The injected solvent has an injected solvent temperature equal to an elevated temperature resulting from heat generated by the exothermic chemical reaction. The elevated temperature is greater than an ambient reservoir temperature. The injecting occurs before the injected solvent temperature has decreased to the ambient reservoir temperature.

The foregoing has broadly outlined the features of the present disclosure so that the detailed description that follows may be better understood. Additional features will also be described therein.

BRIEF DESCRIPTION OF THE DRAWINGS

These and other features, aspects and advantages of the present disclosure will become apparent from the following description, appending claims and the accompanying drawings, which are briefly described below.

Figure 1:
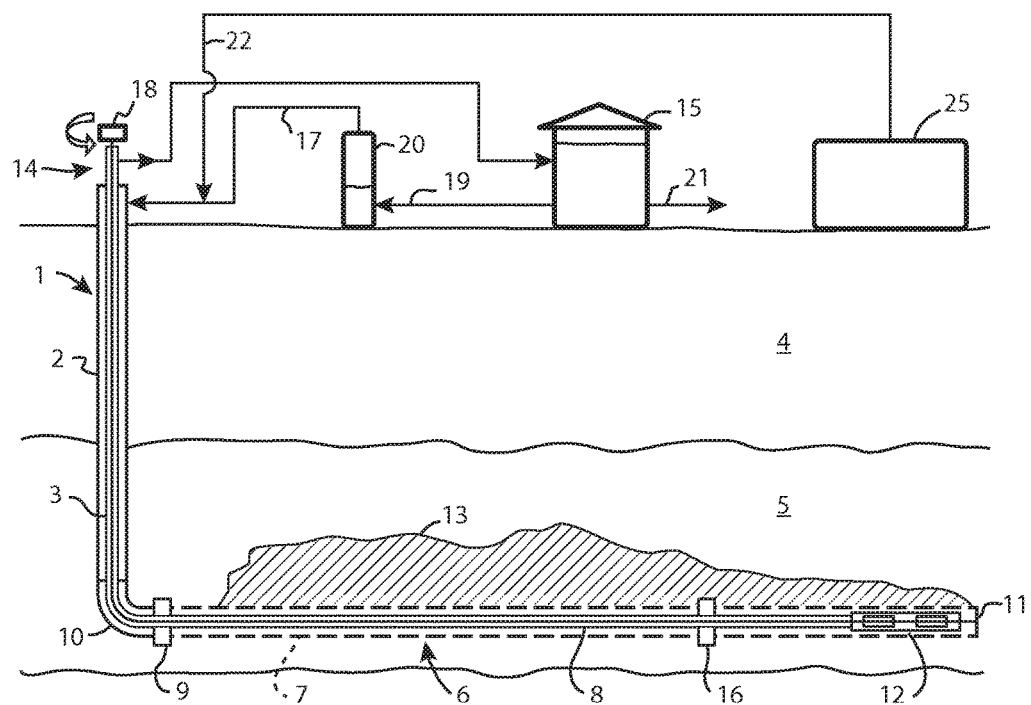
FIG. 1 illustrates a cyclic solvent process.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meanings as used in this context are set forth. To the extent a term used herein is not defined below, it should be given the broadest definition persons in the pertinent art have given that term. Further, the present techniques are not limited by the usage of the terms shown below, as all equivalents, synonyms, new developments, and terms or techniques that serve the same or a similar purpose are considered to be within the scope of the present claims.

"Bitumen" is a naturally occurring heavy oil material. Generally, it is the hydrocarbon component found in oil sands. Bitumen can vary in composition depending upon the degree of loss of more volatile components. It can vary from a very viscous, tar-like, semi-solid material to solid forms. The hydrocarbon types found in bitumen can include aliphatics, aromatics, resins, and asphaltenes. A typical bitumen might be composed of: 19 weight (wt.) % aliphatics (which can range from 5 wt. %-30 wt. %, or higher); 19 wt. % C5-asphaltenes (which can range from 5 wt. %-30 wt. %, or higher); 30 wt. % aromatics (which can range from 15 wt. %-50 wt. %, or higher); 32 wt. % resins (which can range from 15 wt. %-50 wt. %, or higher); and some amount of sulfur (which can range in excess of 7 wt. %). In addition, bitumen can contain some water and nitrogen compounds ranging from less than 0.4 wt. % to in excess of 0.7 wt. %. The metals content, while small, must be removed to avoid contamination of the product synthetic crude oil. Nickel can vary from less than 75 part per million (ppm) to more than 200 ppm. Vanadium can range from less than 200 ppm to more than 500 ppm. The percentage of the hydrocarbon types found in bitumen can vary. As used herein, the term "heavy oil" includes bitumen, as well as lighter materials that may be found in a sand or carbonate reservoir. Heavy oil may have a viscosity of about 1000 centipoise (cP) or more, 10,000 cP or more, 100,000 cP or more or 1,000,000 cP or more.

As used herein, a pressure "cycle" represents a sequential increase to peak operating pressure in a reservoir, followed by a release of the pressure to a minimum operating pressure. The elapsed time between two periods of peak operating pressure does not have to be the same between cycles, nor do the peak operating pressures and minimum operating pressures.

"Facility" as used in this description is a tangible piece of physical equipment through which hydrocarbon fluids are either produced from a reservoir or injected into a reservoir, or equipment which can be used to control production or completion operations. In its broadest sense, the term facility is applied to any equipment that may be present along the flow path between a reservoir and its delivery outlets. Facilities may comprise production wells, injection wells, well tubulars, wellhead equipment, gathering lines, manifolds, pumps, compressors, separators, surface flow lines, steam generation plants, processing plants, and delivery outlets. In some instances, the term "surface facility" is used to distinguish those facilities other than wells.

"Heavy oil" includes oils which are classified by the American Petroleum Institute (API), as heavy oils, extra heavy oils, or bitumens. Thus the term "heavy oil" includes bitumen and should be regarded as such throughout this description. In general, a heavy oil has an API gravity between 22.30 (density of 920 kilogram per meter cubed ($kg/m^3$) or 0.920 gram per centimeter cubed ($g/cm^3$)) and 10.00 (density of 1,000 $kg/m^3$ or 1 gram per centimeter (g/cm)). An extra heavy oil, in general, has an API gravity of less than 10.00 (density greater than 1,000 $kg/m^3$ or greater than 1 g/cm). For example, a source of heavy oil includes oil sands or bituminous sands, which is a combination of clay, sand, water, and bitumen. The thermal recovery of heavy oils is based on the viscosity decrease of fluids with increasing temperature or solvent concentration. Once the viscosity is reduced, the mobilization of fluids by steam, hot water flooding, or gravity is possible. The reduced viscosity makes the drainage quicker, and therefore directly contributes to the recovery rate.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in heavy oil or in oil sands. However, the techniques described herein are not limited to heavy oils, but may also be used with any number of other reservoirs to improve gravity drainage of liquids.

"Permeability" is the capacity of a rock to transmit fluids through the interconnected pore spaces of the rock. The customary unit of measurement for permeability is the milliDarcy (mD).

"Pressure" is the force exerted by a fluid per unit area. Pressure can be shown as pounds per square inch (psi) or kilopascals (KPa). "Atmospheric pressure" refers to the local pressure of the air. "Absolute pressure" (psia) refers to the sum of the atmospheric pressure (14.7 psia at standard conditions) plus the gauge pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentiality equal to the total pressure in the system. Unless otherwise stated, any pressures mentioned herein are absolute pressures.

As used herein, a "reservoir" is a subsurface rock or sand formation from which a production fluid, or a resource, can be harvested. The rock formation may include sand, granite, silica, carbonates, clays, and organic matter, such as bitumen, heavy oil, oil, gas, or coal, among others. Reservoirs can vary in thickness from less than one foot (0.3048 meter (m)) to hundreds of feet (hundreds of m). The resource is generally a hydrocarbon, such as a heavy oil impregnated into a sand bed.

The term "ambient reservoir temperature" as used herein, means the temperature in a heavy-oil containing layer of a reservoir prior to the commencement of a heavy oil extraction process that may artificially increase the temperature of the reservoir layer, i.e. the initial ambient reservoir temperature. The ambient reservoir temperature is typically in a range of 6 to 15 degrees Celsius (° C.), but may vary even more in particular locations or particular layers.

By "solvent-dominated heavy oil recovery process" as used herein, we mean a heavy oil recovery process which relies on the use of a solvent for heavy oil as the principal means or one of the principal means of recovering the heavy oil from a reservoir.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

A "wellbore" is a hole in the subsurface made by drilling or inserting a conduit into the subsurface. A wellbore may have a substantially circular cross section or any other cross-sectional shape, such as an oval, a square, a rectangle, a triangle, or other regular or irregular shapes. As used herein, the term "well," when referring to an opening in the formation, may be used interchangeably with the term "wellbore." Further, multiple pipes may be inserted into a single wellbore, for example, as a liner configured to allow flow from an outer chamber to an inner chamber.

The term "solvent" as used herein is defined as an agent that dilutes or dissolves heavy oil and reduces its viscosity. Many of the prior art "solvents" used for heavy oil recovery, such as single alkanes, mixtures of alkanes and gas plant condensates, are not solvents of heavy oil according to the precise or narrow definition of a solvent, i.e. an agent that completely dissolves all components of a solute below its solubility limit concentration. The above-named so-called solvents do not dissolve the asphaltene component of heavy oils, even in small relative amounts of the heavy oil solute. Nevertheless, they dilute heavy oil and hence may be called diluents. Other agents such as xylene and toluene are solvents according to conventional definition, as they dissolve all components of the heavy oil up to the solubility limit concentration. The term "solvent" as used herein includes both solvents as narrowly defined and diluents as this is the meaning of the term generally understood in this art.

A method of recovering heavy oil from a subterranean heavy oil reservoir is disclosed. To illustrate the method, a modified cyclic solvent process is discussed and illustrated. For ease of understanding, a brief explanation of one example of a cyclic solvent process is provided. It will be noted, however, that the method of recovering heavy oil from a subterranean heavy oil reservoir may be employed with other solvent-dominated heavy oil recovery processes, such as, for example, those processes that employ a solvent as a sole or principal means of heavy oil recovery. Examples of other such heavy oil recovery processes include, but are not limited to, the use of solvent alone, the use of heated liquid solvent or vapor, hybrid processes that also employ steam or other media for heating (e.g. solvent-assisted, steam assisted gravity drainage), cyclic liquid or vaporized solvent injection processes, continuous liquid or vaporized solvent injection, heated VAPEX processes (vapor extraction by injection of vaporized hydrocarbon solvents into heavy oil reservoirs), directly or indirectly heated solvent systems, an N-Solv™ method (which uses warm solvent to extract bitumen from oil sands), etc. In fact, any process that requires a solvent and exhibits improvements when heat is also added to a reservoir may benefit from the disclosed method.

As shown in FIG. 1, a vertical wellbore portion 1 may comprise an outer sleeve 2 and an inner bore 3, driven through overburden 4 into a heavy oil reservoir 5, connected to a horizontal wellbore portion 6. The horizontal wellbore portion 6 may comprise a perforated liner section 7 and an inner bore 8. An isolation packer 9 may be located at or near a heel 10 of the horizontal wellbore portion 6. The heel 10 of the horizontal wellbore portion 6 may be where the horizontal wellbore portion 6 connects to the vertical wellbore portion 1. The connection of the horizontal wellbore portion 6 to the vertical wellbore portion 1 may be continuous. A second packer 16 may be located downstream of isolation packer 9. The second packer 16 may divert solvent to a reservoir that is adjacent to the heavy oil reservoir during production. A downhole pump 12 may be provided at or near toe 11 of the horizontal wellbore portion. The toe 11 of the horizontal wellbore portion may be at an end of the horizontal wellbore portion 6. The toe 11 may be at one end of the horizontal wellbore portion 6 while the heel 10 is at another end of the horizontal wellbore portion 6. The heel 10 may be at the intersection of the horizontal wellbore portion 6 and the vertical wellbore portion 1.

In operation, a total solvent from a pipe 17 may be driven down outer sleeve 2 to perforated liner section 7. The total solvent may comprise an initial solvent. Once driven down the outer sleeve 2 to perforated liner section 7, the total solvent may percolate into the subterranean heavy oil reservoir 5 and penetrate reservoir material within the subterranean heavy oil reservoir 5 to yield a reservoir penetration zone 13. Heavy oil diluted by the total solvent may flow down and collect at or around the toe 11. The heavy oil diluted by the total solvent may then be pumped by down the hole pump 12 through inner bore 8 and inner bore 3 via a motor 18 at a wellhead 14 to a production tank 15. The wellhead 14 may be the topmost portion of the vertical wellbore portion 1. The wellhead 14 may be distal from the horizontal wellbore portion 6. At the production tank 15, the heavy oil (i.e., recovered heavy oil) and total solvent may be separated from one another. Once separated, the total solvent may be recycled through pipe 19 to solvent tank 20 and then through pipe 17 as shown so that heavy oil can continue to be produced from the subterranean heavy oil reservoir 5. The heavy oil produced from the subterranean heavy oil reservoir may be removed from tank 15 through pipe 21.

A fresh solvent may be added via pipe 22 to compensate for losses to the reservoir and to accommodate any additional solvent required for each succeeding cycle as the penetration zone 13 expands (generally 10-15% extra is required for each succeeding cycle over the previous one). The fresh solvent may be heated solvent from a reactor 25, as will be described later. When fresh solvent is added, the total solvent comprises the fresh solvent and the initial solvent. The fresh solvent may be a viscosity-reducing solvent. The initial solvent may be a viscosity-reducing solvent.

The total solvent may be injected at high pressure into the subterranean heavy oil reservoir 5 through the vertical wellbore portion 1 and the horizontal wellbore portion 6. The subterranean heavy oil reservoir 5 may accommodate the total solvent by dilation of a pore space of the subterranean heavy oil reservoir 5 and by compression of pore fluids of the subterranean heavy oil reservoir 5. Once injected into the subterranean heavy oil reservoir 5, the total solvent may mix with the heavy oil to form a mixture. The mixture may be produced from the same vertical and horizontal wellbore portions that the total solvent was injected into the subterranean heavy oil reservoir 5. The mixture may also be produced from a different wellbore(s) from that into which the total solvent was injected. The mixture is driven to the production well (i.e., the well/wellbore(s) that the mixture is produced from) by formation re-compaction, fluid expansion and/or gravity.

The produced fluid rate of the produced solvent may decline with time. The injection and production procedures are repeated until the produced solvent to oil ratio (PSOR) is so high that the incremental production becomes uneconomical because so little heavy oil is recovered for the cost expended. The incremental production is the repeating of the injection and production.

More details of an incremental production may be obtained from U.S. Pat. No. 6,769,486, the disclosures of which are incorporated herein by this reference.

As well as relying on a total solvent to thin and/or dissolve the heavy oil within the subterranean heavy oil reservoir 5 to make the heavy oil recoverable, heat may be introduced into the subterranean heavy oil reservoir to raise the temperature of the heavy oil. Introducing the heat may cause a temperature-related reduction of viscosity of the heavy oil. The introduction of heat could be done by igniting a part of solvent (e.g. propane) below ground (e.g., by burning of solvent below ground). A controlled underground burn of the solvent may heat the reservoir. Introducing heat by igniting a part of the solvent below ground may be difficult to control and consumes a portion of the solvent injected (e.g. up to 10%). The introduction of heat may be done by heating the solvent at a surface of the subterranean heavy oil reservoir prior to injection of the solvent into the reservoir. Introducing heat at the surface may include burning fuel to generate heat transferred to the solvent through a physical barrier, e.g, the wall of a metal tube or heat exchanger. Introducing heat at the surface may generate greenhouse gases and other pollutants that are considered undesirable for environmental reasons. For example, if natural gas is used as a fuel, the natural gas may be completely oxidized and carbon dioxide may be generated and released to the atmosphere.

The present disclosure solves the previous ways of introducing heat into the subterranean heavy oil reservoir 5. The present disclosure discusses a method of recovering heavy oil from the subterranean heavy oil reservoir 5 by conducting an exothermic chemical reaction of at least one feedstock chemical to produce a reaction product that is a first solvent. The method may also include injecting an injected solvent into the subterranean heavy oil reservoir 5. The injected solvent may comprise the reaction product.

The production of a reaction product that may be used as a first solvent by conducting an exothermic chemical reaction differs from heating a solvent by burning a fuel, as was done in the prior art, in at least two ways. Firstly, the reaction product of the exothermic chemical reaction is suitable for use as a first solvent, unlike the fully-oxidized combustion gases produced by burning a fuel in the manner of the prior art. Second, the heat is generated within the solvent itself, and/or intermediate chemical(s), rather than being transferred to the solvent by heat exchange across a physical barrier. As a result of conducting the exothermic chemical reaction, heat generated may be utilized or conserved more efficiently and greenhouse gases or other atmospheric pollutants are minimized.

The exothermic chemical reaction may be carried out at the surface of the ground above the subterranean heavy oil reservoir. The surface may be at, or near, a heavy oil production site. The exothermic chemical reaction may involve the generation of heat so that the reaction product has a greater temperature than it otherwise would have had had the exothermic chemical reaction not been performed. Unlike prior art heating at the surface, the exothermic chemical reaction carried out at the surface may have at least one of the above-mentioned advantages.

The injected solvent has an injected solvent temperature. When the injected solvent is injected, the injected solvent temperature may equal an elevated temperature. The elevated temperature may result from the heat generated by the exothermic chemical reaction. The elevated temperature may be a temperature greater than what the injected solvent temperature would be had the reaction product not been produced from the exothermic chemical reaction conducted. The elevated temperature may be greater than an ambient reservoir temperature. The ambient reservoir temperature may be in a range of 6 to 15° C. inclusive for, for example, heavy oil reservoirs in Canada. The ambient reservoir temperature may be within a range that includes or is bounded by the preceding example. The elevated temperature may be a temperature greater than the ambient reservoir temperature. For example, the elevated temperature may be any temperature greater than 5° C. higher than the ambient temperature.

The injected solvent may be injected into the subterranean heavy oil reservoir before the injected solvent temperature cools down too much. The injected solvent temperature may cool down too much if the injected solvent temperature reaches a temperature where the injected solvent can no longer add significant heat to the heavy oil of the subterranean reservoir and/or can no longer contribute to heat-induced viscosity reduction of the heavy oil. For example, the injected solvent may have cooled down too much if it is injected when the injected solvent temperature has decreased to the ambient reservoir temperature.

The reaction product may be manufactured relatively close to the injected solvent's point of injection into the subterranean heavy oil reservoir. The reaction product may be produced in a central location and transported via insulated pipelines, tankers, or the like to wellbore(s) for injection into a subterranean heavy oil reservoir. In other words, a central reactor facility may provide to supply an entire oilfield, e.g. one consisting of 20-30 pads (a pad being a number of wellbores serviced by a central facility for generation of reaction product, injection of the injected solvent, and processing of solvent-diluted heavy oil), or alternatively a reactor facility may be provided for each individual pad, if desired. The reaction product may be transported for distances up to about 15 (kilometers) km before it cools unduly. The reaction product may be transported for distances up to about 5 km. The reaction product may be transported before the reaction product cools to a temperature that makes it ineffective for reducing the viscosity of heavy oil when injected into the subterranean heavy oil reservoir. The reaction product may be transported within a range that includes or is bounded by any of the preceding examples.

The injected solvent may heat the subterranean heavy oil reservoir 5. The injected solvent heat because the injected solvent may be injected at an injected solvent temperature equal to the elevated temperature. The injected solvent reduces the viscosity of the heavy oil due to the heated injected solvent and solvent dilution. The undesirable formation of two solvent/heavy-oil layers may be suppressed by the combined effect of heat and solvent dilution.

A heat-generating, exothermic chemical reaction for the production of the injected solvent from feedstock chemicals may be employed to manufacture a reaction-product. An example of a heat-generating, exothermic chemical reaction is to produce dimethyl ether (DME) as the reaction product by reacting methane ($CH_4$) with oxygen. This may proceed according to the following three reactions:

Production of Syngas from Methane (Exothermic):

$$CH_4 + \tfrac{1}{2}O_2 \rightarrow CO + 2H_2 \; \Delta H = -22 \text{ KJ/mol}$$

The above reaction occurs when a sub-stoichiometrical methane-air mixture is partially combusted in a reformer, creating a hydrogen-rich syngas. C stands for carbon. H stands for hydrogen. O stands for Oxygen. ΔH stands for change in heat. KJ stands for kilojoule.
Production of Methanol from Syngas (Exothermic):

$$CO+2H_2 \rightarrow CH_3OH \quad \Delta H=-91 \text{ KJ/mol}$$

The above reaction may be carried out as a gas-phase process at a pressure in a range of 700-2,000 psig using a copper-based catalyst such as $Cu/ZnO/Al_2O_3$ or $Cu/ZnO/Cr_2O_3$ in a fixed-bed reactor. Cu stands for copper. Zn stands for Zinc. Al stands for aluminum. Cr stands for Chromium. Conversion of Methanol to DME by Chemical Dehydration (Exothermic):

$$2CH_3OH \rightarrow CH_3OCH_3 + H_2O \quad \Delta H=-23 \text{ KJ/mol.}$$

The dehydration reaction above may be carried out, for example, over a commercial γ-$Al_2O_3$ catalyst, e.g., at temperatures of 240-340° C., a liquid hourly space velocity (LHSV) of 0.9-6.0 $h^{-1}$ and pressures between 0.1 and 1.0 (MegaPascal) MPa. (see Zhang, Liang et al., "*Dehydration of Methanol to Dimethyl Ether Over γ-Al2O3 Catalyst: Intrinsic Kinetics and Effectiveness Factor*", Canadian Journal for Chemical Engineering, published online Feb. 5, 2013). Any of the aforementioned ranges may be within a range that includes or is bounded by any one of the preceding examples.

The heat generations by the aforementioned reactions are confirmed, for example, by the disclosures in Lyubovsky, M. et al, *Catalytic Partial Oxidation of Methane to Syngas at Elevated Pressures, Catalysis Letters*, Vol. 99, Nos. 3-4, February 2005, and in *Dimethyl Ether (DME) Technology and Markets*, PERP07/08-S3, ChemSystems PERP Program, Nexant, Page 2, December 2008, the disclosures of which publications, and that in the paragraph above, are specifically incorporated herein by reference.

The gross heat generated during the aforementioned manufacture of DME is close to 3.6 Gigajoule per meter cubed ($GJ/m^3$) DME. The heat generated is significant enough that, even after accounting for possible heat usage for other process functions (see below), and heat losses during transportation from a central DME production site to the wellbore(s), the heat remaining in the DME injected into the subterranean heavy oil reservoir may be sufficient to provide significant heavy oil uplift in heavy oil recovery.

The methane used as a feedstock chemical for the aforementioned heat-generated exothermic chemical reaction may be readily available on site as a component of the heavy oil production, or from natural gas. The methane may be piped in from another nearby source, such as a natural gas production plant.

Methane and oxygen may be used as feedstock chemicals for making DME at or near a heavy oil production site through three exothermic chemical reactions: syngas from methane, methanol from syngas and DME from methanol. The three exothermic chemical reactions may be carried out in one step, two steps, or three steps in a corresponding number of reactors. The heat generated by the exothermic chemical reactions may raise the temperature of the DME product. The raised temperature may be within any suitable temperature range. For example, the raised temperature may be within 300 to 400° C. The raised temperature may be about 350° C. The raised temperature may be within a range that includes or is bounded by the preceding example. The syngas reaction does not have to employ methane as a feedstock chemical. The syngas reaction may be carried out with any source of carbon and hydrogen, e.g., by employing biomass, coal or other fuels.

As an alternative to the production of DME from methanol as a feedstock chemical, the methanol may first be produced from carbon dioxide and hydrogen as feedstock chemicals, i.e. by the reaction shown below, which is exothermic:

$$CO_2+3H_2 \rightarrow CH_3OH+H_2O$$

The methanol produced in this way may be converted to DME by dehydration, as shown previously.

Any source of waste carbon dioxide may be used, e.g. carbon dioxide removed from combustion gases or produced by cement plants. The consumption of carbon dioxide in the alternative to the production of DME may reduce atmospheric emissions of this greenhouse gas. The hydrogen feedstock may be obtained by electrolysis, e.g. using electricity obtained from a hydroelectric installation, a nuclear power plant, a wind farm or a solar electricity installation, all of which avoid the generation of greenhouse gases. Further details of generation of DME is disclosed, for example, in IEAGHG Information Paper; 2013-IP6: Cement *Plant CO2 to DME*, June 2013, and also in Qi Gong-Xin, et al., *DME Synthesis from Carbon Dioxide and Hydrogen over Cu-Mo/HZSM-5*, Catalysis Letters Vol. 72, No. 1-2, 2001, the disclosures of which are incorporated herein by reference.

The feedstock chemical for the production of DME may be methanol itself, e.g. produced in conventional ways from corn, sugar cane or other renewable substrates. The feedstock chemical may be delivered to the subterranean heavy oil reservoir over long distances by tanker, train and/or pipeline.

Heated methanol, e.g. methanol produced from syngas as indicated above, may be used as an injected solvent for heavy oil recovery. Methanol is much more soluble in water than DME and has a higher boiling point, making it less suitable than DME in some recovery processes, but possibly useful in circumstances where methanol may have particular advantages, e.g. where it may also serve as a hydrate inhibitor.

Diethyl ether (DEE) may be manufactured and utilized as an alternative to DME in equivalent ways, e.g. utilizing, for example, ethane or ethanol as feedstock chemicals and similar exothermic chemical reactions. The heated DEE may be used as the injected solvent for heavy oil recovery. The heated DEE may be suitable in higher temperature processes than the cyclic solvent processes as described above. For example, DEE may be suitable in a process also utilizing steam (e.g. solvent assisted, steam assisted gravity drainage) when it may possibly be mixed with other solvents (i.e. one or more second solvents), e.g. hydrocarbons, such as alkanes or gas plant condensates. DME may be suitable for use in processes utilizing steam, but may be less effective than DEE because of the differences in boiling points between DEE and DME.

Regardless of the reaction product produced, the injected solvent may be formed by mixing the reaction product with a second solvent. The injected solvent may be formed by mixing in a solvent-dominated heavy oil recovery process carried out in the subterranean heavy oil reservoir 5. The mixing may occur at any suitable location. For example, the mixing may occur before the injected solvent is transported via pipeline to the wellbore(s) or at the wellbore(s) site.

Injecting an injected solvent comprised of the reaction product and the second solvent may recover more heavy oil than merely using the reaction product or the second solvent.

For example, a blend of DME as the reaction product and propane as the second solvent recover more heavy oil than propane alone in core floods even at room temperatures. When DME is the reaction product and propane is the second solvent, the DME in the injected solvent may be at least 5% more than the propane by volume in the injected solvent. The heat in the DME produced as above, used in conjunction with the second solvent, may help recover additional heavy oil by viscosity reduction of the heavy oil and second liquid phase suppression.

The second solvent may be any suitable solvent. For example, the second solvent may comprise propane or other hydrocarbons, single alkanes, mixtures of alkanes, gas plant condensates, cyclohexane, and cyclopentane, each used alone or mixed with one or more of the others.

The second solvent may be at a different temperature than the reaction product when the injected solvent is formed by mixing the second solvent and the reaction product. For example, the second solvent may be at ambient reservoir temperature. Alternatively, for example, the second solvent may be heated. The second solvent may be heated by heat exchange with hot fluids generated by producing the reaction product (e.g., by the three exothermic chemical reactions for producing DME shown above). Regardless of whether the second solvent is heated or not at mixing, the temperature of the second solvent and the reaction product is such that the temperature of the injected solvent is high enough to achieve the improved extraction results.

Figure 2:
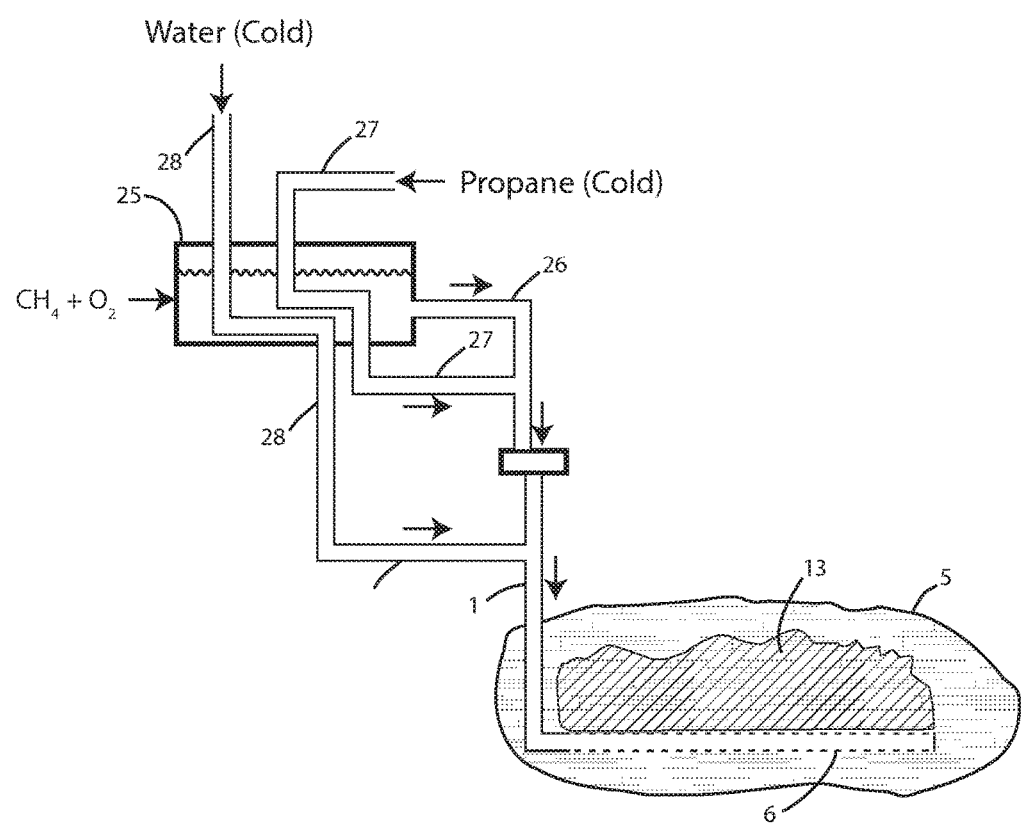
FIG. 2 is a schematic illustration of one form of a process and apparatus.

An arrangement wherein a second solvent is mixed with the reaction product is shown in FIG. 2. In FIG. 2, the second solvent is heated by the reaction product. Reactor 25 is shown as a simple tank, but this may represent a single reactor in which all three of the individual chemical reactions shown above are carried out, or two or three reactors in which one or two of the individual chemical reactions are carried out. Ancillary equipment such as product separators may be used, as will be known to persons skilled in the art. The reaction product may leave reactor 25 via a pipe 26. The reaction produce may have an elevated temperature resulting from heat generated by the chemical reactions. As previously described, the elevated temperature may be a temperature greater than the ambient reservoir temperature. The reaction product may be mixed with a second solvent. The second solvent may be passed through reactor 25 via a pipe 27 for heat exchange with the hot reaction product within the reactor 25. Pipes 26 and 27 merge downstream of the reactor 25 to allow mixing of the reaction product and second solvent. After being mixed, the reaction product and second solvent form the injected solvent. The injected solvent may be injected into the wellbore 1.

If the second solvent is not mixed with the reaction product, the reaction product may be injected into the wellbore 1 as an injected solvent without being mixed with the second solvent.

The apparatus of FIG. 2 may have a pipe for the introduction of water 28 that is transformed to steam as it passes through the reactor 25 and is heated by the fluids generated during the production of the reaction product. The steam produced may be injected downhole into wellbore 1, as shown, or used in surface facilities. The steam injected may be used for heating the wellbore 1 only through recirculation, without contacting the heavy oil, thereby improving the flow of recovered heavy oil during the production stage. The steam injected may be allowed to contact heavy oil outside the wellbore. Steam has one of the highest latent heats of condensation, so the use of steam provides an efficient way of introducing excess heat from the exothermic chemical reactions into parts of the subterranean heavy oil reservoir. When employed, the steam may be introduced at temperatures up to about 300° C. The temperature is within a range that includes or is bounded by the preceding example. Steam may be introduced to preheat the heavy oil before the start of the process. Steam may be introduced between two cycles. Steam may be co-injected when the injected solvent comprises the reaction product and not the second solvent or when the injected solvent comprises the reaction product and the second solvent. Steam may be used to prevent hydrate-formation by raising the temperature of the fluids outside the temperature regime of hydrate formation. Steam may be used to improve inflow of the viscous, second liquid phase, if formed.

As much as 20% by volume of the reaction product, or reaction product and second solvent, initially introduced into the subterranean heavy oil reservoir may remain in the subterranean heavy oil reservoir. The reaction product and/or second solvent that do not remain in the subterranean heavy oil reservoir 5 may be contained in the heavy oil produced from the subterranean heavy oil. The reaction product and/or second solvent contained in the heavy oil produced may be useful as a diluent or thinner to facilitate pipeline transport of the heavy oil. The reaction product and/or second solvent remaining in the subterranean heavy oil reservoir may be produced at the end of the process by, for example, blowdown. In blowdown, reservoir pressure is lowered and/or an inexpensive gas (air, nitrogen or flue gas containing $CO_2$) is injected to displace the reaction product and/or second solvent remaining in the subterranean heavy oil reservoir 5.

If propane is used as the second solvent, the propane may be extracted from the heavy oil produced. Propane is volatile and therefore, may not suitable when present in a pipeline intended for transportation of heavy oil. Evaporation of the propane tends to cool the heavy oil produced/recovered, so the presence of the reaction product may be useful as a diluent to remain in the recovered heavy oil intended for pipelining.

The injected solvent may be recovered from the heavy oil and re-used, as shown in FIG. 1. In such a case, additional solvent may be added as noted above. As shown in FIG. 1, the reactor 25 may then be used for manufacturing additional solvent that is introduced into the apparatus of FIG. 1 via pipe 22 and mixed with the injected solvent recovered from the heavy oil produced. Even though the injected solvent recovered may be at ambient surface temperature or only slightly above, the temperature of the additional solvent introduced through pipe 22 may be high enough to provide the injected solvent injected into reservoir 5 with a suitably elevated temperature to increase the temperature by at least 5° C. above the ambient reservoir temperature within the penetration zone 13. The injected solvent recovered may be heated by heat exchange with heat generated by the exothermic chemical reaction (or reactions) taking place in reactor 25.

The equipment (reactor(s), etc.) used for the manufacture of the reaction product may be made portable (e.g. built onto movable trailers or the like). The portability allows the reaction product to be transferred from one location to another location as required. For example, in a cyclic solvent process, the reaction product may be required for the injection phase at one pad, and may then be transported to another pad when the injection phase is complete and the recovery phase commences. It may also be desirable to make the equipment modular as well as portable so that the capacity of the equipment for reaction product production may be increased as more equipment is required to fill in the increasingly depleted reservoir volume during later cycles of a cyclic solvent process. Thus, the modules of the reactor apparatus may be configured to be combined or separated to vary an amount of the reaction product produced by the reactor apparatus.

The injected solvent may be effective to increase heavy oil recovery if the temperature of the injected solvent is at an elevated. The elevated temperature may be the elevated temperature previously defined. For example, the elevated temperature (also referred to as the injected solvent elevated temperature) may be at least 20° C. The injected solvent elevated temperature may be at least 25° C. The injected solvent elevated temperature may be at least 30° C. The injected solvent elevated temperature may be chosen from the range of 30 to 350° C., or higher. The injected solvent elevated temperature may be in the range of 30 to 90° C. The injected solvent elevated temperature may be such that makes the subterranean heavy oil reservoir temperature at least about 70° C. in the region contacted by the injected solvent. The injected solvent elevated temperature may be within a range that includes or is bounded by any of the preceding examples. Normally, the higher the injected solvent elevated temperature is, the better the recovery of heavy oil.

As previously discussed, the elevated temperature may be greater than the ambient temperature. The ambient temperature may be the ambient temperature previously defined. For example, the ambient temperature may be between 6 to 15° C., inclusive. The injected solvent elevated temperature may be 5° C., or more, higher than the ambient.

The test described below illustrates the effectiveness of heat introduced into a subterranean reservoir to improve the recovery of heavy oil. While in this test the heat was not introduced by injecting a heated solvent into the reservoir formation, the test nevertheless shows the results that may be expected by such injection.

Figure 3:
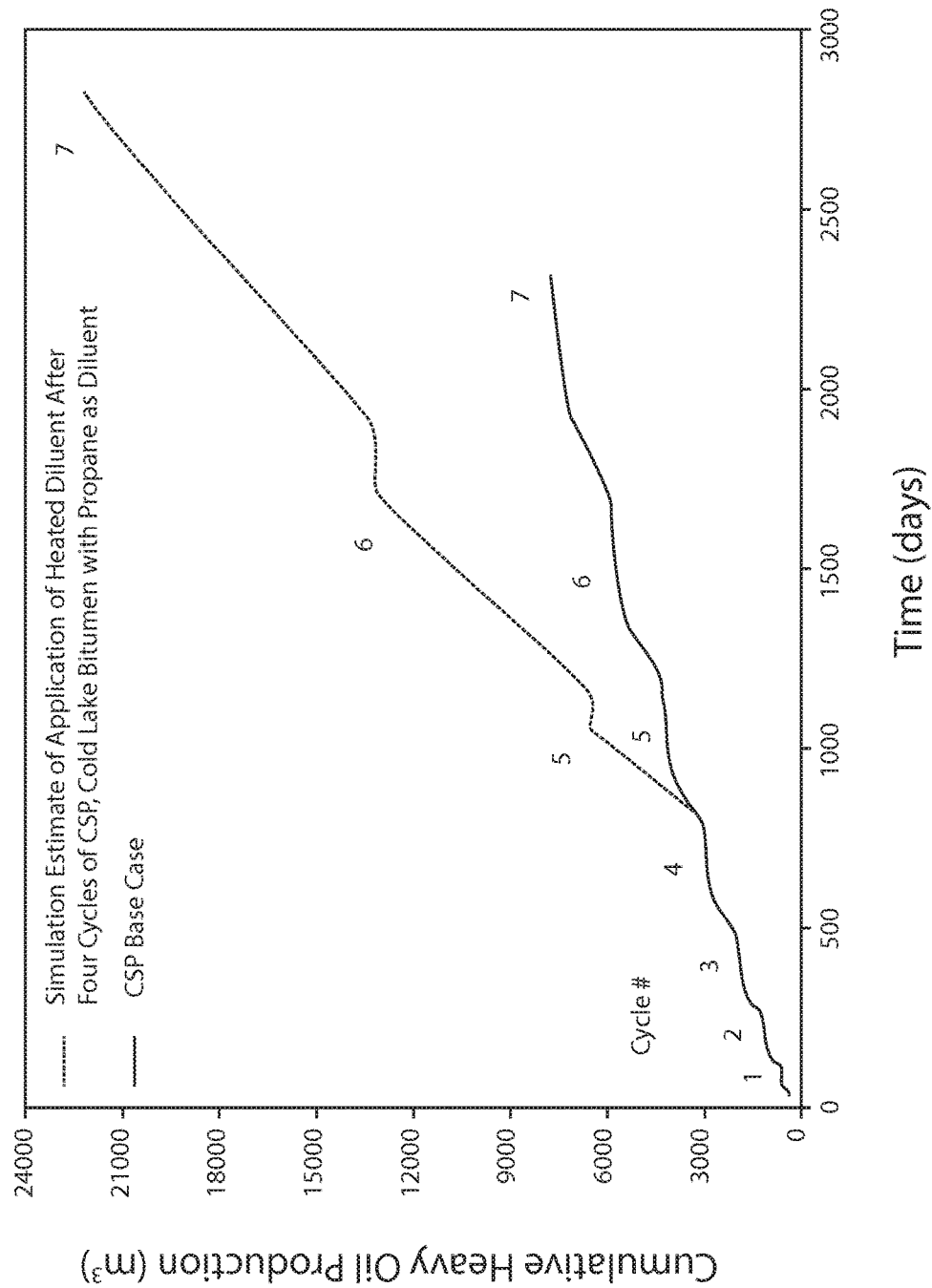
FIG. 3 is a graph showing cumulative bitumen production of cyclic solvent processes as described below.

The test involved using a simulator that predicts oil recovery from various recovery processes. The simulation was set up for a CSP base case in which the solvent was propane. The solid line trace of FIG. 3 shows the predicted cumulative bitumen production after seven cycles of base CSP (i.e. without the use of a heated solvent). To determine the potential effect of a heated solvent on base CSP, the solvent to introduce 13 terajoule (TJ) of heat was added to a specified small reservoir volume right above the horizontal wellbore portion before the start of the fifth cycle. The heat added was equivalent to burning 10% of the propane volume in that cycle. After the heat addition, the remaining 90% of the cycle 5 target CSP solvent was injected in the simulation to contact the already-heated reservoir rocks. As shown by the dotted line trace of FIG. 3, the solvent heating in cycle 5 led to an increase of about 1.8 times in cumulative bitumen production over that in the five base CSP cycles combined. Several-fold production uplift in cycles 6 and 7 resulted from injecting solvent alone without further heat addition.

To exemplify the benefit of the method of this disclosure, it may be assumed that, in the test above, the propane solvent is replaced with a 30 DME: 70 propane (% v/v) blend, with the DME in the blend having been prepared on site from methane. In manufacturing 30% of the fifth cycle target CSP solvent as DME, the heat generated will be 15 TJ. Even after accounting for the heat used in other process functions, and heat losses from the delivery of the DME from the production site to the bottom hole location of a well, the heat remaining in the injected DME is higher than the 13 TJ added in the first part of the same test (FIG. 3), which resulted in a several fold increase in bitumen production over the base CSP. In the first part of the example, the heat is assumed to be generated by burning 10% of the solvent (propane) downhole. Downhole burning has operational issues like ignition control, burn zone location control, well burn-out, and explosion. However, the example serves to illustrate the effect of heat on cumulative heavy oil production to show what may be expected when using a solvent heated in accordance with the present disclosure.

While the test above shows the introduction of heat following the fourth cycle, it will be appreciated that the use of a heated solvent in accordance with the current disclosure may be advantageous for any cycle, and is optionally employed for all cycles, especially the early ones to achieve heating of the reservoir as early as possible.

As utilized herein, the terms "approximately," "about," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

It should be understood that numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

The articles "the", "a" and "an" are not necessarily limited to mean only one, but rather are inclusive and open ended so as to include, optionally, multiple such elements.

What is claimed is:

1. A method of recovering heavy oil from a subterranean heavy oil reservoir, the method comprising:
conducting an exothermic chemical reaction of a feedstock chemical at the surface of the ground above the subterranean heavy oil reservoir thereby producing a reaction product that is a first solvent, wherein the reaction product is dimethyl ether;
injecting an injected solvent comprising the reaction product into the subterranean heavy oil reservoir,
wherein said injected solvent has an injected solvent temperature equal to an elevated temperature resulting from heat generated by said exothermic chemical reaction, the elevated temperature being greater than an ambient reservoir temperature, and
wherein injecting occurs before said injected solvent temperature has decreased to said ambient reservoir temperature.

2. The method of claim 1, further comprising forming the injected solvent by mixing the reaction product with a second solvent.

3. The method of claim 2, wherein injecting the injected solvent occurs before said injected solvent temperature has decreased to a temperature 30° C. higher than said ambient reservoir temperature.

4. The method of claim 2, wherein injecting the injected solvent occurs while said elevated temperature is in a range of 30 to 350° C.

5. The method of claim 1, wherein injecting the injected solvent occurs before said injected solvent temperature has decreased to a temperature 5° C. higher than said ambient reservoir temperature.

6. The method of claim 1, wherein injecting the injected solvent occurs before said injected solvent temperature has decreased to a temperature 20° C. higher than said ambient reservoir temperature.

7. The method of claim 1, wherein conducting the exothermic chemical reaction comprises producing the reaction product by reacting methane and oxygen as said feedstock chemical according to reactions (a), (b) and (c) below:

$$CH_4 + \tfrac{1}{2}O_2 \rightarrow CO + 2H_2; \tag{a}$$

$$CO + 2H_2 \rightarrow CH_3OH; \text{ and} \tag{b}$$

$$2CH_3OH \rightarrow CH_3OCH_3 + H_2O. \tag{c}$$

8. The method of claim 7, further comprising carrying out said reactions (a), (b) and (c) in multiple reactors.

9. The method of claim 1, wherein conducting the exothermic chemical reaction comprises producing the reaction product by converting methanol as said feedstock chemical to dimethyl ether by dehydration according to reaction (d) below:

$$2CH_3OH \rightarrow CH_3OCH_3 + H_2O. \tag{d}$$

10. The method of claim 1, wherein conducting the exothermic chemical reaction comprises producing the reaction product by reacting carbon dioxide with hydrogen as said feedstock chemical to form methanol according to reaction (e) below:

$$CO_2 + 3H_2 \rightarrow CH_3OH + H_2O, \tag{e}$$

followed by converting methanol to dimethyl ether according to dehydration reaction (c) below:

$$2CH_3OH \rightarrow CH_3OCH_3 + H_2O. \tag{f}$$

11. The method of claim 1, further comprising generating steam by exposing liquid water to heat from said exothermic chemical reaction.

12. The method of claim 1, wherein injecting said injected solvent comprises injecting said injected solvent through a wellbore in said subterranean heavy oil reservoir.

13. The method of claim 12, wherein conducting said exothermic chemical reaction occurs at a location no more than 25 km from said wellbore.

14. The method of claim 13, further comprising transporting said injected solvent from said location to said wellbore with one of a heat-insulated pipeline and a heat-insulated container.

15. The method of claim 1, wherein said exothermic chemical reaction occurs in a reactor apparatus comprising a reactor.

16. The method of claim 15, further comprising transporting said reactor apparatus from a first location to a second location that is different from the first location.

17. The method of claim 15, wherein said reactor apparatus is modular and wherein modules within the reactor apparatus are configured to be combined or separated to vary an amount of said reaction product produced by said reactor apparatus.

18. The method of claim 1, further comprising forming the injected solvent by a solvent-dominated heavy oil recovery process, wherein said solvent-dominated heavy oil recovery process comprises one of (i) a cyclic solvent process, (ii) a heated continuous solvent injection process employing a well pair for injection and production, (iii) a heated liquid process and (iv) a heated vapor process.

19. The method of claim 18, further comprising removing heavy oil mixed with said injected solvent from said subterranean heavy oil reservoir through said wellbore after injecting the injected solvent.

20. The method of claim 19, wherein said injected solvent removed with said heavy oil comprises a recovered reaction product and wherein the method further comprises mixing the recovered reaction product with said reaction product before injecting the injected solvent.

21. The method of claim 20, further comprising heating the recovered reaction product with heat from said exothermic chemical reaction before mixing.

* * * * *